(12) United States Patent
Milton et al.

(10) Patent No.: US 7,042,961 B2
(45) Date of Patent: May 9, 2006

(54) FULL RATE ERROR DETECTION CIRCUIT FOR USE WITH EXTERNAL CIRCUITRY

(75) Inventors: Paul Spencer Milton, San Diego, CA (US); Eunhwa Jennifer Lenehan, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 837 days.

(21) Appl. No.: 10/193,962

(22) Filed: Jul. 12, 2002

(65) Prior Publication Data

US 2004/0008638 A1 Jan. 15, 2004

(51) Int. Cl.
*H04L 25/06* (2006.01)
*H04L 25/10* (2006.01)

(52) U.S. Cl. .................. 375/317; 375/316; 375/329

(58) Field of Classification Search ............... 375/317
See application file for complete search history.

(56) References Cited

U.S. PATENT DOCUMENTS 3,670,304 A * 6/1972 Andresen et al. .......... 714/709
6,363,049 B1 * 3/2002 Chung ....................... 370/210

* cited by examiner

*Primary Examiner*—Chieh M. Fan
*Assistant Examiner*—Erin M. File
(74) *Attorney, Agent, or Firm*—Law Office of Gerald Maliszewski; Gerald Maliszewski

(57) ABSTRACT

A system and method are provided for selecting an optimal threshold detection level for a single serial data input receiver. The method comprises: receiving a serial data stream of pseudorandom binary information; using a plurality of threshold detection levels, estimating bit values; comparing the differences between estimated bit values; and, adjusting the threshold levels to minimize the difference between comparisons of estimated bit values. In some aspects, comparing the differences between estimated bit values includes: counting a first number of differences between the first and third thresholds; counting a second number of differences between the second and third thresholds; and, adjusting the first and second thresholds until the first number equals the second number.

18 Claims, 5 Drawing Sheets

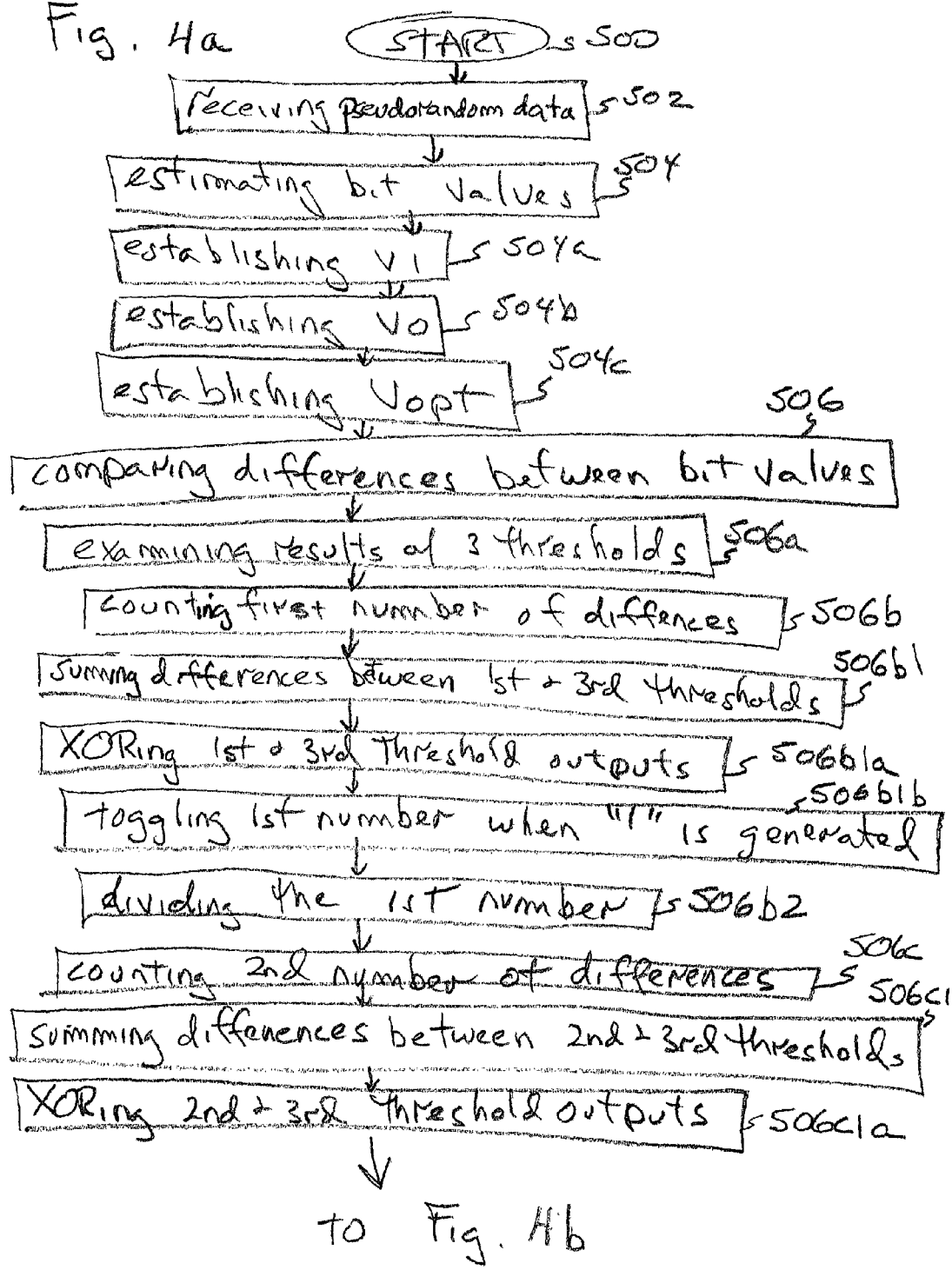

↓ from Fig. 4a

Hoggling 2nd number when "1" is generated — 506c1b dividing the 2nd number — 506c2 adjusting thresholds — 508 averaging voltage — 508a initially adjusting 3rd threshold to equal average voltage — 508b Using Vopt as optimal threshold detection level — 510

Fig. 4b

FULL RATE ERROR DETECTION CIRCUIT FOR USE WITH EXTERNAL CIRCUITRY

BACKGROUND OF THE INVENTION

1. Field of the Invention

This invention generally relates to digital communications and, more particularly, to a system and method for minimizing the effects of inter-symbol interference in a non-return to zero (NRZ) data channel.

2. Description of the Related Art

FIG. 1 is a diagram illustrating a signal recovered from a binary symmetric, non-dispersive channel in the presence of noise (prior art). Conventionally, the signal is filtered with a transfer function matched to the signaling waveform (in this case a one unit step) and thresholded at the voltage level most likely to yield the transmitted bit. To recover the transmitted information, a hard decision must be made on the value of the received bit.

As a function of the filtering process, and sometimes as a result of the transmission process, pulse spreading occurs. That is, the energy associated with a bit spreads to neighboring bits. For small degrees of spreading these effects of this can be limited to the nearest neighbors with modest degradation in performance.

Three basic types of pulse spreading exist. The first possibility is that both the neighboring bits are a zero (no neighboring bits are a one). The second possibility is that only one of the neighboring bits (either the preceding or subsequent bit) is a one. Alternately stated, only one of the neighboring bits is a zero. The third possibility is that both neighboring bits are one. The degree of dispersion exhibited by a channel, and hence the separation of the probability density functions, varies in response to a number of fixed and variable factors. Effective dispersion mitigation techniques must therefore be easily optimized to the channel and somewhat adaptive to changes in the channel due to aging, temperature changes, reconfiguration, and other possible influences.

It would be advantageous if multiple thresholds could be used to set and adjust an optimal threshold detection level.

SUMMARY OF THE INVENTION

The present invention provides a means of determining the optimal voltage level for a single serial data input threshold without the use of an external bit error rate calculator. The optimal threshold level can be determined and the threshold adjusted over the course of normal operation. The present invention is a relatively simple process that permits the bit error rate of a receiver system to be reduced. The error detection circuit allows the receiver chip to recover an input data signal with a poor "eye". Therefore, system designers can run data signals over a longer distance of fiber optic cable before needing to receive and retransmit the signal. This leads to lower system costs.

Accordingly, a method is provided for selecting an optimal threshold detection level for a single serial data input receiver. The method comprises: receiving a serial data stream of pseudorandom binary information; using a plurality of threshold detection levels, estimating bit values; comparing the differences between estimated bit values; and, adjusting the threshold levels to minimize the difference between comparisons of estimated bit values.

Estimating bit values using a plurality of threshold detection levels includes: establishing a first threshold (V1) to distinguish a high probability one bit value estimate; establishing a second threshold (V0) to distinguish a high probability zero bit value estimate; and, establishing a third threshold (Vopt) to distinguish first bit estimates between the first and second thresholds.

In some aspects, comparing the differences between estimated bit values includes: for each received bit, examining the results of the three thresholds; counting a first number of differences between the outputs of the first and third thresholds; counting a second number of differences between the outputs of the second and third thresholds. Then, adjusting the threshold levels to minimize the difference between comparisons of estimated bit values includes adjusting the first and second thresholds until the first number equals the second number. Once the first and second thresholds are determined, the optimal (third) threshold can be determined approximately midway between the first and second thresholds.

Additional details of the above-described method and a system for selecting an optimal threshold detection level in a single serial data input receiver are provided below.

BRIEF DESCRIPTION OF THE DRAWINGS

FIGS. 4a and 4b are flowcharts illustrating the present invention method for selecting an optimal threshold detection level for a single serial data input receiver.

DETAILED DESCRIPTION OF THE PREFERRED EMBODIMENTS

Figure 2:
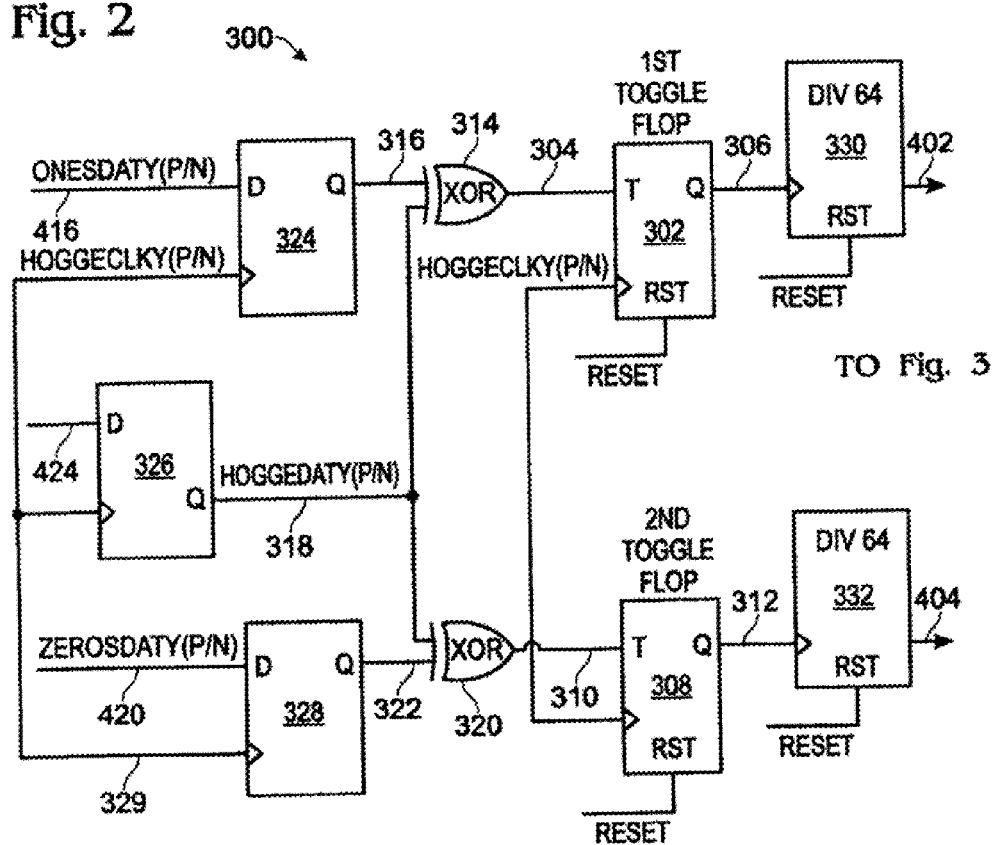
FIG. 2 is a schematic diagram of the present invention system for selecting an optimal threshold detection level in a single serial data input receiver.
Figure 3:
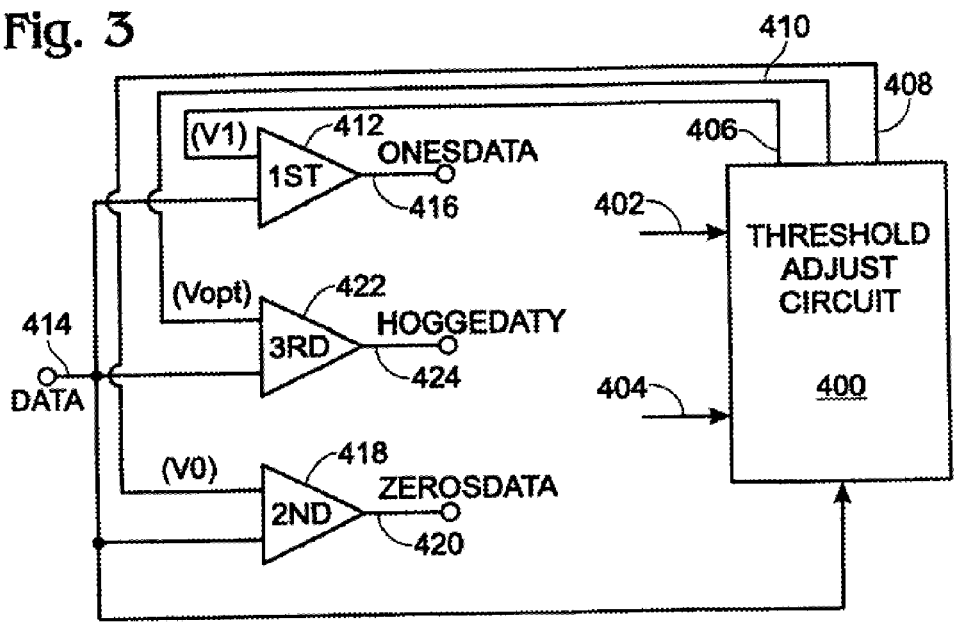

FIG. 2 is a schematic diagram of the present invention system for selecting an optimal threshold detection level in a single serial data input receiver. The system 300 comprises a first toggle flip-flop 302 having an input to accept differences between first and third threshold detector outputs on line 304, and an output on line 306 to supply a first tally of the differences. A second toggle flip-flop 308 has an input on line 310 to accept differences between second and third threshold detector outputs, and an output on line 312 to supply a second tally of differences.

Figure 1:
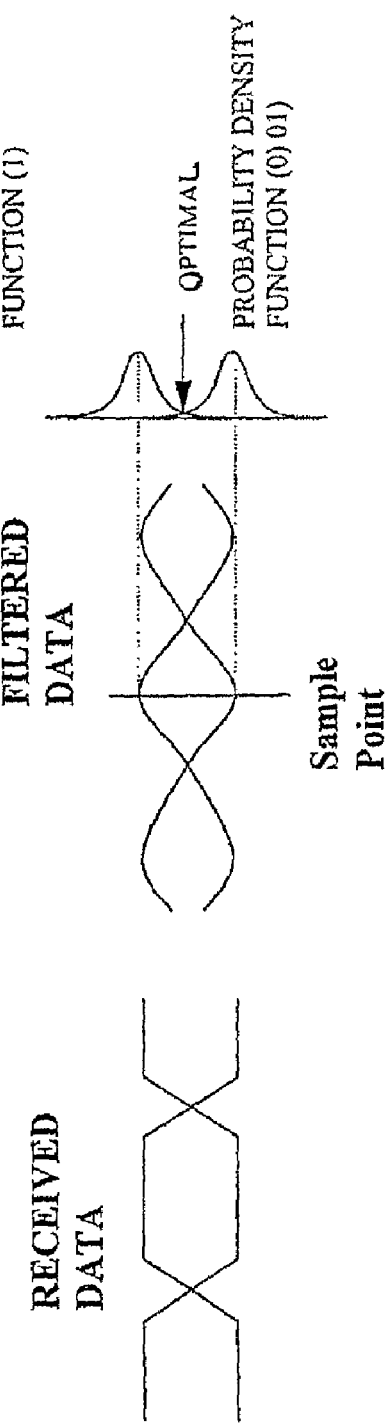
FIG. 1 is a diagram illustrating a signal recovered from a binary symmetric, non-dispersive channel in the presence of noise (prior art).
Figure 3:
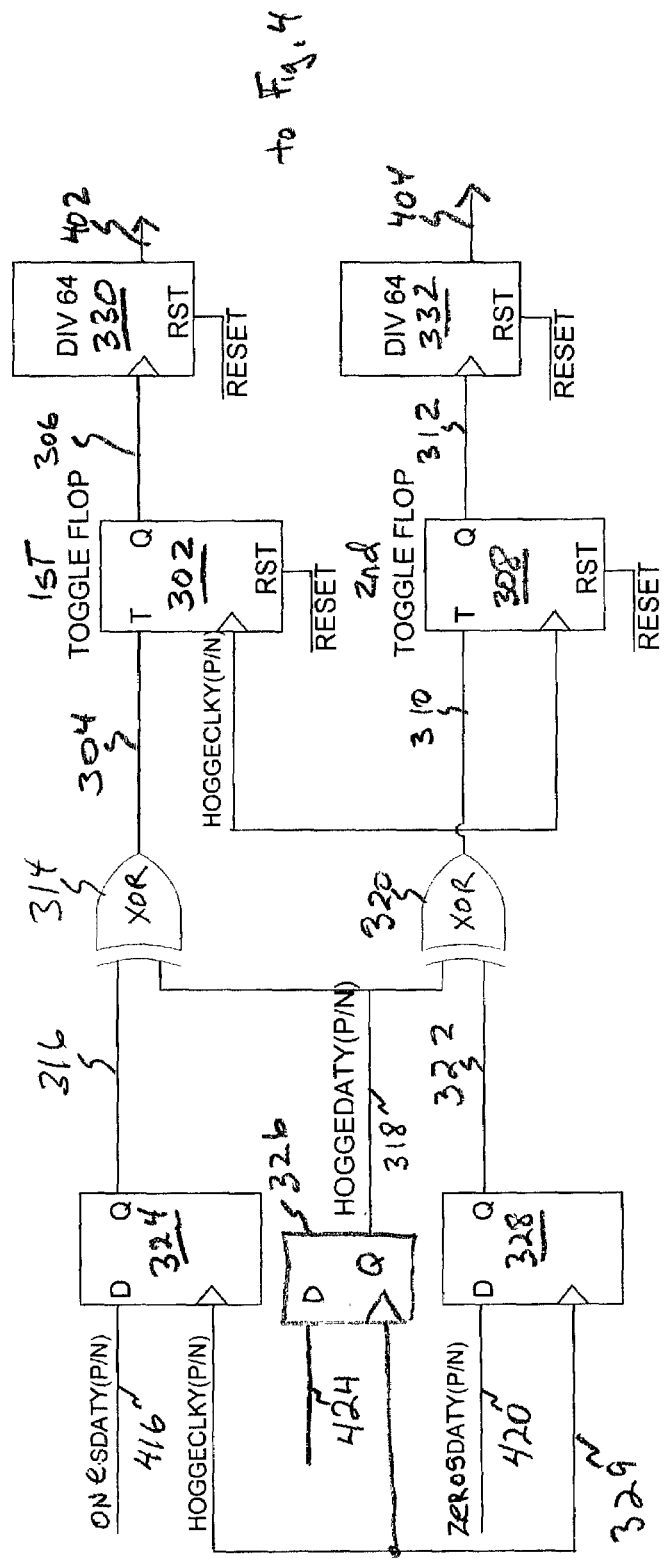
FIG. 3 is a schematic diagram illustrating a threshold adjustment circuit.
Figure 3:
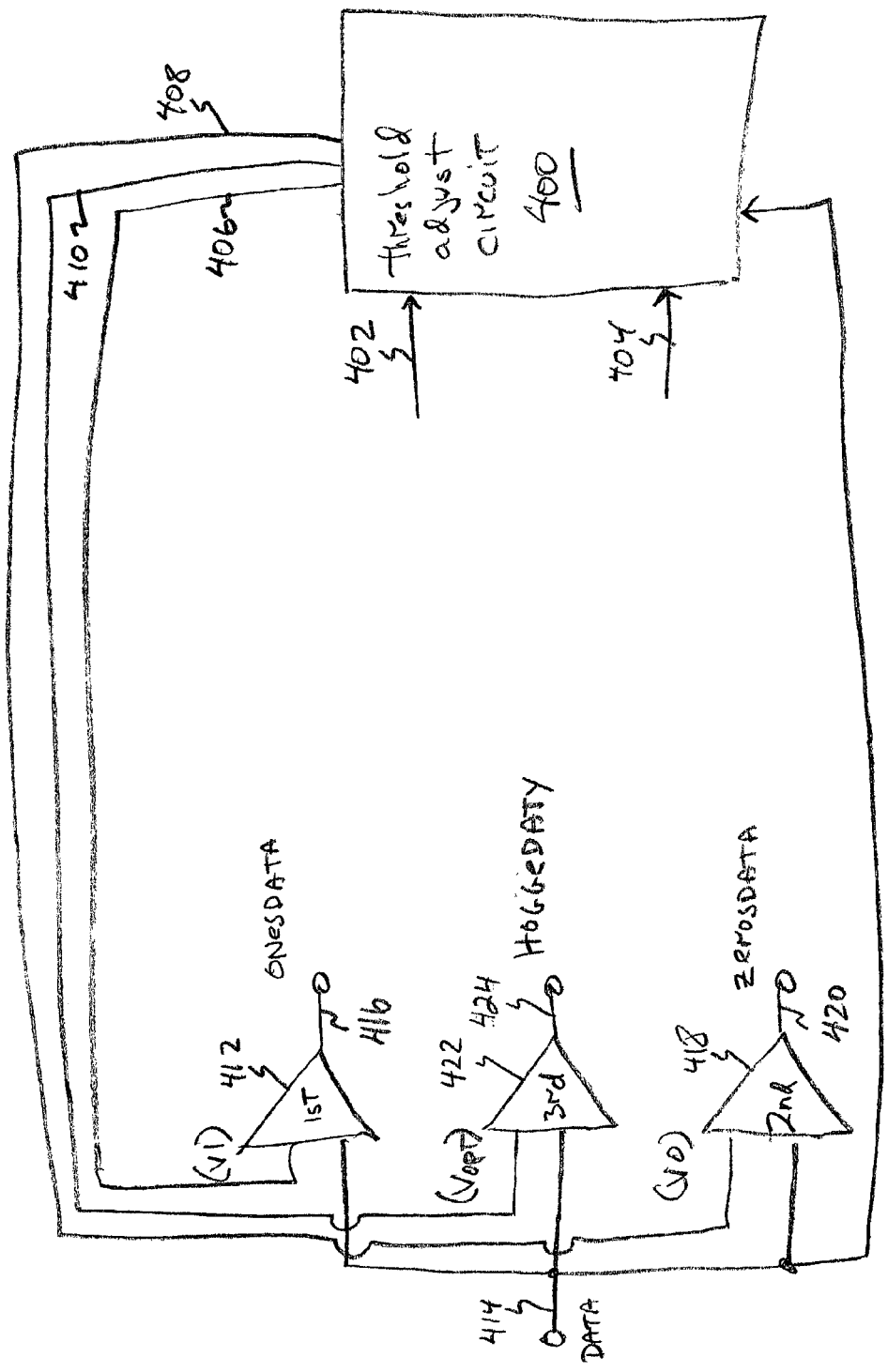
Figure 1:
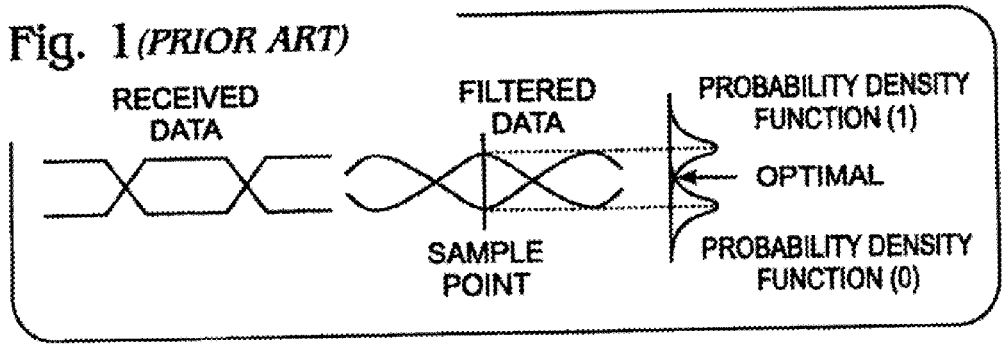

FIG. 3 is a schematic diagram illustrating a threshold adjustment circuit. Threshold adjustment circuit 400 has an input connected to the output of the first flip-flop on line 402 and an input connected to the output of the second flip-flop on line 404. The threshold adjustment circuit 400 has an output on line 406 to supply first threshold value (V1), an output on line 408 to supply second threshold value (V0), and an output on line 410 to supply third threshold value (Vopt). The threshold adjustment circuit 400 creates a first count of the first tally and a second count of the second tally. The threshold adjustment circuit 400 adjusts the three thresholds in response to comparing the first and second counts.

Returning to FIG. 2, the system 300 further comprises a first exclusive-OR 314 (XOR) having an input on line 316 to accept the first threshold detector output (onesdata), an input on line 318 to accept the third threshold detector output (hoggedata), and an output on line 304 connected to the first flip-flop input. A second XOR 320 has an input on line 322 to accept the second threshold detector output (zerosdata), an input on line 318 to accept the third threshold detector output, and an output on line 310 connected to the second flip-flop input. D flip-flops 324, 326, and 328 are used to retime the comparator outputs to a common data clock (hoggeclky) on line 329.

Returning to FIG. 3, a first comparator 412 has an input on line 414 to accept a pseudorandom serial data stream, an input connected to the threshold adjustment circuit output on line 406 to accept the first threshold, and an output on line 416 (onesdata) connected to the first XOR to supply the first threshold detector output. The first comparator 412 distinguishes when the data stream input on line 414 has a high probability of being a "1" bit value.

A second comparator 418 has an input on line 414 to accept the pseudorandom serial data stream, an input connected to the threshold adjustment circuit output on line 408 to accept the second threshold, and an output on line 420 connected to the second XOR to supply a second threshold detector output. The second comparator 418 distinguishes when the data stream input on line 414 has a high probability of being a "0" bit value. The first threshold is set to a relatively high voltage level so that only a high voltage signal triggers the first comparator. Likewise, the second threshold is set to a relatively low voltage level so that only a very low voltage fails to trigger the second comparator.

A third comparator 422 has an input on line 414 to accept the pseudorandom serial data stream, an input connected to the threshold adjustment circuit output on line 410 to accept the third threshold, and an output on line 424 connected to the first and second XORs to supply a third threshold detector output. The third comparator 422 distinguishes the data stream input on line 414 with the optimal threshold detection level. In some aspects, the first 412, second 418, and third 422 comparators receive non-return to zero (NRZ) serial input data on line 414. Once the optimal threshold detection level has been set with certainty, the first and second comparators 412/418 are no longer needed. Likewise, once the optimal threshold detection level has been set on line 410, the above-mentioned threshold adjustment circuit is no longer required.

Considering FIGS. 2 and 3, the threshold adjustment circuit 400 adjusts the first threshold on line 406 and the second threshold on line 408 to make the first count equal the second count. The threshold adjustment circuit 400 adjusts the third threshold on line 410 approximately midway between the first and second thresholds. When a channel asymmetry is known, the third threshold can be offset to account for the asymmetry. In some aspects of the invention, the threshold adjustment circuit 400 has an input on line 414 to measure the serial data input voltage. The threshold adjustment circuit 400 averages the serial data input voltage and initially sets the third threshold on line 410 equal the average serial data input voltage.

Some aspects of the system 300 further comprise a first divider 330 (see FIG. 2) having an input connected to the output of the first flip-flop on line 306 and an output on line 402 connected to the threshold adjustment circuit input. Likewise, a second divider 332 has an input on line 312 connected to the output of the second flip-flop and an output on line 404 connected to the threshold adjustment circuit input. As shown, the first and second dividers 330 and 332 are divide-by-64 dividers. However, the invention is not limited to any particular division ratio.

Functional Description

The error detection circuit outputs the rate of differences between the outputs of three variable threshold comparators, as applied to the incoming data stream. To accomplish this, the incoming data stream is sent through three variable threshold comparators each with a discrete threshold. The error detection circuit clocks in the outputs of the three threshold comparators and increments a counter if the threshold operations result in different output states. Two separate comparisons are made, one between the middle threshold voltage data (Vopt) and a high threshold voltage data (V1), the other between middle threshold voltage data and a low threshold voltage data (V0). Each time a difference occurs, a counter is incremented. There are two counters, one for each of the comparisons.

In operation, the middle threshold voltage level is set to the serial data's average voltage using a sense line. Both the high voltage threshold level and the low threshold level are varied such that differences result from the comparisons. The rate of these differences is measured by an external circuit, such as the threshold adjust circuit. That circuit adjusts the high and the low voltage threshold levels until the rate of differences resulting from the two comparisons is equal. The optimal middle threshold voltage level is the average of the high threshold voltage and the low threshold voltage. This voltage is then applied to the middle threshold circuit and the bit error rate is reduced.

Three threshold comparators with discrete threshold voltages, high (V1), mid (Vopt), and low (V0), are applied to the incoming serial data stream. The outputs of these threshold detectors are sampled simultaneously at the serial data rate producing three serial data channels. The data compared using threshold voltages high, mid, and low produce respective data channels, high data, mid data, and low data. From this point on, the error detection circuit is symmetrical and the mid data channel passes into both sides of the circuit. The mid data channel and either the high or low data channel are inputs to an XOR logic gate. The result of this function is passed to a toggle flip-flop (T-FF). The output of this flip-flop is fed into a divide-by-64 circuit such that the maximum frequency on the output line is reduced. This is acceptable as only the rate of differences between thresholded bits is relevant.

Figure 4A:
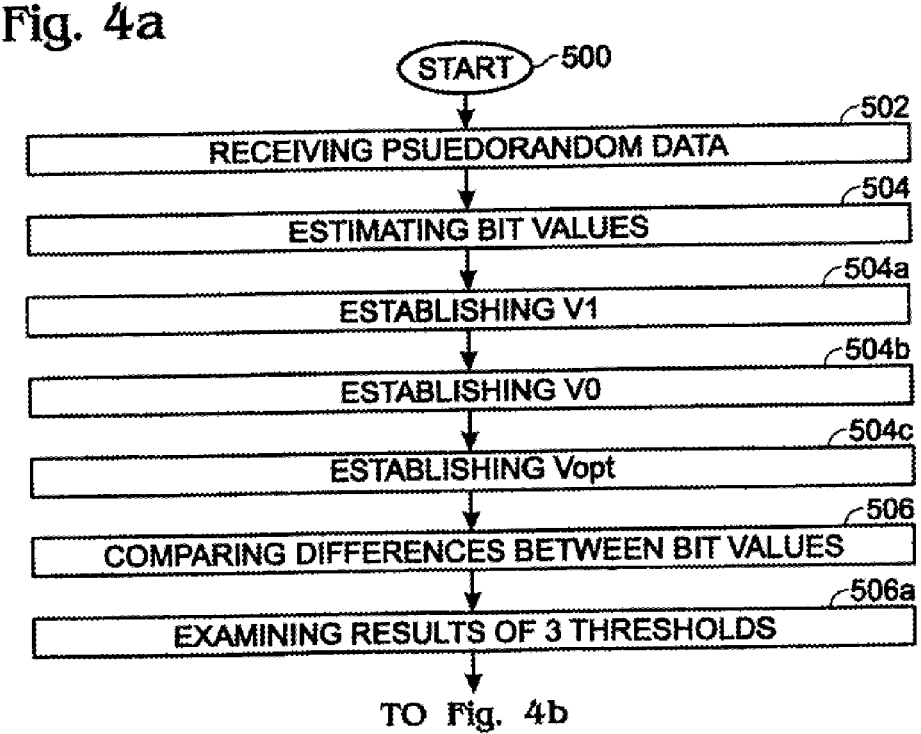

FIGS. 4a and 4b are flowcharts illustrating the present invention method for selecting an optimal threshold detection level for a single serial data input receiver. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 500.

Step 502 receives a serial data stream of pseudorandom binary information. In some aspects, a non-return to zero (NRZ) data stream is received. Step 504, using a plurality of threshold detection levels, estimates bit values. Step 506 compares the differences between estimated bit values. Step 508 adjusts the threshold levels to minimize the difference between comparisons of estimated bit values.

In some aspects of the method, estimating bit values using a plurality of threshold detection levels in Step 504 includes substeps. Step 504a establishes a first threshold (V1) to distinguish a high probability one bit value estimate. Step 504b establishes a second threshold (V0) to distinguish a high probability zero bit value estimate. Step 504c establishes a third threshold (Vopt) to distinguish first bit estimates between the first and second thresholds. Although the invention is described as using a three level input differentiation scheme, it should be understood that the present invention concept has broader applications and is not limited to any particular number of thresholds.

In other aspects, comparing the differences between estimated bit values in Step 506 includes substeps. Step 506a, for each received bit, examines the outputs of the three thresholds. Step 506b counts a first number of differences between the outputs of the first and third thresholds. Step 506c counts a second number of differences between the outputs of the second and third thresholds. Then, adjusting the threshold levels to minimize the difference between comparisons of estimated bit values in Step 508 includes adjusting the first and second thresholds until the first number equals the second number.

In some aspects, adjusting the threshold levels to minimize the difference between comparisons of estimated bit values in Step 508 further includes adjusting the third threshold approximately midway between the first and second thresholds. In some aspects the method includes a further step. Step 510 uses the third threshold as the optimal threshold detection level. The serial data can then be detected using the optimal (third) threshold detection level.

In other aspects, adjusting the threshold levels to minimize the difference between comparisons of estimated bit values in Step 508 includes other substeps. Step 508a averages the voltage of the serial data stream. Step 508b initially adjusts the third threshold to equal the serial data stream average voltage.

In some aspects, counting a first number of differences between the outputs of the first and third thresholds in Step 506b includes substeps. Step 506b1 sums the differences between the outputs of the first and third thresholds. Step 506b2 divides the sum by a third number to generate the first number. Likewise, counting a second number of differences between the outputs of the second and third thresholds in Step 506c includes substeps. Step 506c1 sums the differences between the outputs of the second and third thresholds. Step 506c2 divides the sum by the third number to generate the second number. In one aspect of the method, the third number is equal to 64.

In other aspects, summing the differences between the outputs of the first and third thresholds in Step 506b1 includes additional substeps. Step 506b1a performs an exclusive-OR (XOR) operation comparing the first and third threshold outputs. Step 506b1b toggles the first number when a "1" bit is generated. Likewise, summing the differences between the outputs of the second and third thresholds in Step 506c1 includes substeps. Step 506c1a performs an exclusive-OR operation comparing the second and third threshold outputs. Step 506c1b toggles the second number when a "1" bit is generated.

A system and method have been presented for selecting an optimal threshold detection level for a single serial data input receiver. Some specific circuit examples have given for implementation of the present invention concept. However, the invention is not necessarily limited to these examples. Further, the invention has been presented in the context of a three-threshold system. However, the invention would be applicable to systems with a different number of thresholds. Other variations and embodiments of the invention will occur to those skilled in the art.

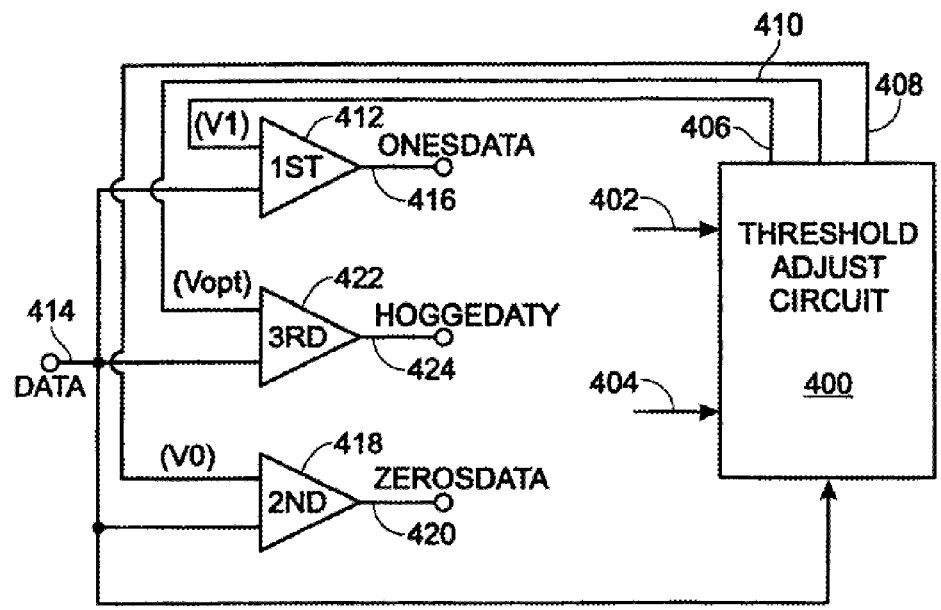

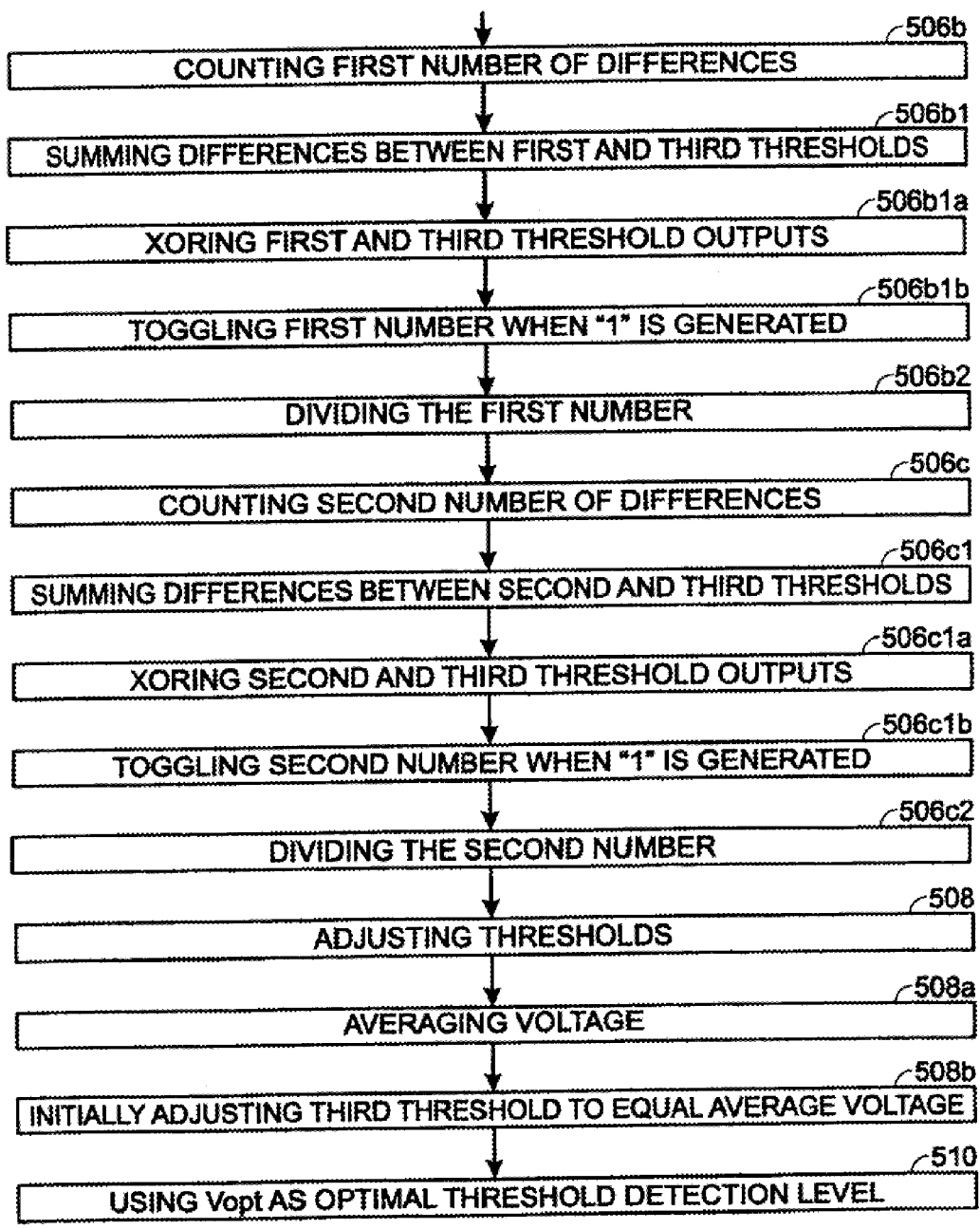

We claim:

1. A method for selecting an optimal threshold detection level for a single serial data input receiver, the method comprising:
   receiving a serial data stream of pseudorandom binary information;
   using a plurality of threshold detection levels, estimating bit values as follows:
      establishing a first threshold (V1) to distinguish a high probability one bit value estimate;
      establishing a second threshold (V0) to distinguish a high probability zero bit value estimate; and,
      establishing a third threshold (Vopt) to distinguish first bit estimates between the first and second thresholds;
   comparing the differences between estimated bit values as follows:
      for each received bit, examining outputs of the three thresholds;
      counting a first number of differences between the outputs of the first and third thresholds:
      counting a second number of differences between the outputs of the second and third thresholds; and,
   adjusting the threshold levels to minimize the difference between comparisons of estimated bit values by adjusting the first and second thresholds until the first number equals the second number.

2. The method of claim 1 wherein adjusting the threshold levels to minimize the difference between comparisons of estimated bit values further includes adjusting the third threshold approximately midway between the first and second thresholds.

3. The method of claim 2 further comprising:
   using the third threshold as the optimal threshold detection level.

4. The method of claim 3 wherein adjusting the threshold levels to minimize the difference between comparisons of estimated bit values includes:
   averaging a voltage of the serial data stream; and,
   initially adjusting the third threshold to equal the serial data stream average voltage.

5. The method of claim 3 wherein counting a first number of differences between the outputs of the first and third thresholds includes:
   summing the differences between the outputs of the first and third thresholds; and;
   dividing the sum by a third number to generate the first number; and,
   wherein counting a second number of differences between the second and third thresholds includes:
   summing the differences between the outputs of the second and third thresholds; and;
   dividing the sum by the third number to generate the second number.

6. The method of claim 5 wherein summing the differences between the outputs of the first and third thresholds includes:
   performing an exclusive-OR operation comparing the first and third threshold outputs; and;
   toggling the first number when a "1" bit is generated; and,
   wherein summing the differences between the outputs of the second and third thresholds includes:
   performing an exclusive-OR operation comparing the second and third threshold outputs; and,
   toggling the second number when a "1" bit is generated.

7. The method of claim 5 wherein dividing the sum by a third number includes the third number being equal to 64.

8. The method of claim 1 wherein receiving a serial data stream of pseudorandom binary information includes receiving a non-return to zero (NRZ) data stream.

9. A method for selecting an optimal threshold detection level in a single serial data input receiver, the method comprising:
  receiving a serial data stream of pseudorandom binary information;
  establishing a first threshold (V1) to distinguish a high probability one bit value estimate;
  establishing a second threshold (V0) to distinguish a high probability zero bit value estimate;
  establishing a third threshold (Vopt) to distinguish first bit estimates between the first and second thresholds;
  summing differences between outputs of the first and third thresholds to generate a first number;
  summing differences between outputs of the second and third thresholds to generate a second number;
  adjusting the first and second thresholds until the first number equals the second number;
  adjusting the third threshold approximately midway between the first and second thresholds; and,
  using the third threshold as the optimal threshold detection level.

10. A system for selecting an optimal threshold detection level in a single serial data input receiver, the system comprising:
  a first toggle flip-flop having an input to accept differences between first and third threshold detector outputs, and an output to supply a first tally of the differences;
  a second toggle flip-flop having an input to accept differences between second and third threshold detector outputs, and an output to supply a second tally of differences; and,
  a threshold adjustment circuit having an input connected to the output of the first flip-flop, an input connected to the output of the second flip-flop, and outputs to supply first (V1), second (V0), and third optimal threshold values in response to creating a first count of the first tally, creating a second count of the second tally, and comparing the first and second counts.

11. The system of claim 10 further comprising:
  a first exclusive-OR (XOR) having an input to accept the first threshold detector output, an input to accept the third threshold detector output, and an output connected to the first flip-flop input; and,
  a second XOR having an input to accept the second threshold detector output, an input to accept the third threshold detector output, and an output connected to the second flip-flop input.

12. The system of claim 11 further comprising:
  a first comparator having an input to accept a pseudorandom serial data stream, an input connected to the threshold adjustment circuit output to accept the first threshold, and an output connected to the first XOR to supply the first threshold detector output, distinguishing when the data stream input has a high probability of being a "1" bit value;
  a second comparator having an input to accept the pseudorandom serial data stream, an input connected to the threshold adjustment circuit output to accept the second threshold, and an output connected to the second XOR to supply a second threshold detector output, distinguishing when the data stream input has a high probability of being a "0" bit value; and,
  a third comparator having an input to accept the pseudorandom serial data stream, an input connected to the threshold adjustment circuit output to accept the third threshold, and an output connected to the first and second XORs to supply a third threshold detector output, distinguishing the data stream input with the optimal threshold detection level.

13. The system of claim 12 wherein the threshold adjustment circuit adjusts the first and second thresholds to make the first and second counts equal.

14. The system of claim 13 wherein the threshold adjustment circuit adjusts the third threshold approximately midway between the first and second thresholds.

15. The system of claim 14 wherein the threshold adjustment circuit has an input to measure the serial data input voltage, the threshold adjustment circuit averaging the serial data input voltage and initially setting the third threshold equal the average serial data input voltage.

16. The system of claim 14 further comprising:
  a first divider having an input connected to the output of the first flip-flop and an output connected to the threshold adjustment circuit input; and,
  a second divider having an input connected to the output of the second flip-flop and an output connected to the threshold adjustment circuit input.

17. The system of claim 16 wherein the first and second dividers are divide-by-64 dividers.

18. The system of claim 12 wherein the first, second, and third comparators receive non-return to zero (NRZ) serial input data.

* * * * *

UNITED STATES PATENT AND TRADEMARK OFFICE
CERTIFICATE OF CORRECTION

PATENT NO. : 7,042,961 B2
APPLICATION NO. : 10/193962
DATED : May 9, 2006
INVENTOR(S) : Milton et al.

It is certified that error appears in the above-identified patent and that said Letters Patent is hereby corrected as shown below:

The title page showing the illustrative figure should be deleted to be replaced with the attached title page.

The drawing sheets, consisting of Figs. 1-4b, should be deleted to be replaced with the drawing sheets, consisting of Figs. 1-4b, as shown on the attached pages.

Signed and Sealed this

Twenty Second Day of April, 2008

JON W. DUDAS
*Director of the United States Patent and Trademark Office*

United States Patent
Milton et al.

(10) Patent No.: US 7,042,961 B2
(45) Date of Patent: May 9, 2006

(54) FULL RATE ERROR DETECTION CIRCUIT FOR USE WITH EXTERNAL CIRCUITRY

(75) Inventors: Paul Spencer Milton, San Diego, CA (US); Eunhwa Jennifer Lenehan, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 837 days.

(21) Appl. No.: 10/193,962

(22) Filed: Jul. 12, 2002

(65) Prior Publication Data
US 2004/0008638 A1 Jan. 15, 2004

(51) Int. Cl.
H04L 25/06 (2006.01)
H04L 25/10 (2006.01)

(52) U.S. Cl. .................. 375/317; 375/316; 375/329

(58) Field of Classification Search ........... 375/317
See application file for complete search history.

(56) References Cited
U.S. PATENT DOCUMENTS 3,670,304 A * 6/1972 Andresen et al. ........... 714/709
6,363,049 B1 * 3/2002 Chung ........................ 370/210

* cited by examiner

Primary Examiner—Chieh M. Fan
Assistant Examiner—Erin M. File
(74) Attorney, Agent, or Firm—Law Office of Gerald Maliszewski; Gerald Maliszewski

(57) ABSTRACT

A system and method are provided for selecting an optimal threshold detection level for a single serial data input receiver. The method comprises: receiving a serial data stream of pseudorandom binary information; using a plurality of threshold detection levels, estimating bit values; comparing the differences between estimated bit values; and, adjusting the threshold levels to minimize the difference between comparisons of estimated bit values. In some aspects, comparing the differences between estimated bit values includes: counting a first number of differences between the first and third thresholds; counting a second number of differences between the second and third thresholds; and, adjusting the first and second thresholds until the first number equals the second number.

18 Claims, 5 Drawing Sheets